United States Patent
Moehrle et al.

(10) Patent No.: US 12,072,612 B2
(45) Date of Patent: Aug. 27, 2024

(54) CAMERA MODULE, METHOD FOR MANUFACTURING A CAMERA MODULE

(71) Applicant: Robert Bosch GmbH, Stuttgart (DE)

(72) Inventors: Andreas Moehrle, Stuttgart (DE); Daniel Beurer, Weil der Stadt (DE); Moritz Winkler, Waldbronn (DE); Nikolai Bauer, Moeglingen (DE); Peter Diesel, Bad Hindelang (DE)

(73) Assignee: ROBERT BOSCH GMBH, Stuttgart (DE)

( * ) Notice: Subject to any disclaimer, the term of this patent is extended or adjusted under 35 U.S.C. 154(b) by 571 days.

(21) Appl. No.: 17/305,590

(22) Filed: Jul. 9, 2021

(65) Prior Publication Data

US 2022/0019130 A1    Jan. 20, 2022

(30) Foreign Application Priority Data

Jul. 15, 2020    (DE) ................. 10 2020 208 805.5

(51) Int. Cl.
*G03B 17/12* (2021.01)
*G02B 7/02* (2021.01)

(52) U.S. Cl.
CPC ............ *G03B 17/12* (2013.01); *G02B 7/022* (2013.01)

(58) Field of Classification Search
CPC ........ G03B 17/12; G03B 17/02; G03B 43/00; G02B 7/022; G02B 27/0006; H04N 23/54; H04N 23/55
See application file for complete search history.

(56) References Cited

U.S. PATENT DOCUMENTS

| | | |
|---|---|---|
| 2007/0069105 A1 | 3/2007 | Lin |
| 2008/0013187 A1* | 1/2008 | Craen ............... G02B 3/14 359/665 |
| 2010/0247086 A1 | 9/2010 | Tallaron et al. |
| 2016/0069641 A1* | 3/2016 | Kortemeier ............ F41G 1/383 206/316.1 |
| 2018/0013939 A1 | 1/2018 | Shigemitsu et al. |
| 2019/0208094 A1 | 7/2019 | Nakamura et al. |

FOREIGN PATENT DOCUMENTS

DE   102018213387 A1   2/2020

OTHER PUBLICATIONS

Designfax ("Engineer's Toolbox: Experts answer questions . . . ", Oct. 27, 2015. Retrieved Feb. 2, 2024, from www.designfax.net/cms/dfx/opens/article-viewdefx.php?id=4&bid=502&et=featurearticle&pn=06). (Year: 2015).*

* cited by examiner

*Primary Examiner* — Joseph P Martinez
*Assistant Examiner* — Ray Alexander Dean
(74) *Attorney, Agent, or Firm* — NORTON ROSE FULBRIGHT US LLP; Gerard A. Messina

(57) ABSTRACT

A camera module that includes an objective lens with an electrical interface and a device for electrically contacting the objective lens in the area of the electrical interface. The device for electrically contacting are also connected to an electronics system, in particular to a circuit board, of the camera module. The electrical interface is formed at the objective lens on the outer circumferential side, and the device for electrical contacting includes an annular body situated on the objective lens on the outer circumferential side, with contacts formed on the inner circumferential side. A method for manufacturing a camera module is also provided.

19 Claims, 9 Drawing Sheets

CAMERA MODULE, METHOD FOR MANUFACTURING A CAMERA MODULE

CROSS REFERENCE

The present application claims the benefit under 35 U.S.C. § 119 of German Patent Application No. DE 102020208805.5 filed on Jul. 15, 2020, which is expressly incorporated herein by reference in its entirety.

FIELD

The present invention relates to a camera module. The camera module is usable in particular in the automotive field, for example for surroundings monitoring. Mobile terminals from the consumer sector and/or professional or scientific applications are alternative areas of use.

Moreover, the present invention relates to a method for manufacturing a camera module.

BACKGROUND INFORMATION

A generic camera module includes an objective lens with an electrical interface and means for electrically contacting the objective lens in the area of the electrical interface. The objective lens is accordingly suppliable with electrical energy, for example for operating a lens heater or objective lens heater, with the aid of which fogging and/or icing up of a lens, in particular the front lens, of the objective lens are/is to be prevented. Alternatively or additionally, the electrical energy may be used to operate an autofocus device, an active image stabilization system, a variable aperture, or the like.

Plug-in connectors represent conventional means for electrically contacting a camera objective lens. A plug-in connection between the objective lens and an internal electronics system of the camera module or to an external voltage supply may be established with the aid of the plug-in connectors. However, establishing a plug-in connection with an internal electronics system is difficult due to the generally very confined installation space, so that it is not suitable for mass production. Establishing a plug-in connection to an external voltage supply requires an installation space that is adapted to the camera module. In addition, the external contacting is exposed to environmental influences such as moisture, which may have an adverse effect on the reliability and/or the service life of the camera module.

SUMMARY

An object of the present invention is to make the manufacture of a camera module, in particular the electrical contacting of an objective lens of the camera module, easier and more cost-efficient. In particular, the aim is to increase the degree of automation during manufacture so that the camera module may be mass-produced.

To achieve the object, a camera module in accordance with an example embodiment of the present invention is provided. Advantageous embodiments of the present invention are disclosed herein. Moreover, a method for manufacturing a camera module is provided.

In accordance with an example embodiment of the present invention, the camera module includes an objective lens with an electrical interface and means (a device) for electrically contacting the objective lens in the area of the electrical interface. The means for electrically contacting are also connected to an electronics system, in particular to a circuit board, of the camera module. According to the present invention, the electrical interface is formed at the objective lens on the outer circumferential side, and the means for electrical contacting include an annular body situated on the objective lens on the outer circumferential side, with contacts formed on the inner circumferential side.

Accordingly, in accordance with an example embodiment of the present invention, in the camera module, the electrical contacting of the objective lens takes place internally via the existing electronics system. This means that the installation space accommodating the camera module does not have to meet special requirements. In addition, the internal contacting is protected from external effects or environmental influences.

For the internal contacting, the objective lens of the camera module in accordance with an example embodiment of the present invention includes an electrical interface on the outer circumferential side. This may involve, for example, strip conductors or contacts that are mounted on the outer circumferential side. During the installation of the camera module, these strip conductors or contacts are lined up with the contacts of the annular body, which for this purpose is slid onto the objective lens. Since the contacts of the annular body are situated on the inner circumferential side, the electrical contact may be established by simply sliding the annular body onto the objective lens.

During the installation, the objective lens is generally aligned with respect to an image sensor of the camera module ("active alignment" process). The means for electrical contacting must accordingly allow a certain tolerance compensation. In addition, the means must not exert a force on the objective lens that affects the orientation of the objective lens. The aim is therefore to achieve electrical contacting that is free of force and that compensates for tolerances to the greatest extent possible.

For the provided camera module, a certain tolerance compensation is already achieved when the annular body is slid onto the objective lens. If the annular body is held solely or predominantly via the objective lens, the objective lens may still be aligned with respect to the image sensor. However, in this case measures must be taken so that the slid-on annular body is captively held on the objective lens.

In one refinement of the present invention, it is therefore provided that the annular body is connected to the objective lens in a force-fit and/or firmly bonded manner. The force fit may be effectuated, for example, by a clamping force that is exerted by the annular body. The clamping force is preferably selected in such a way that, although the annular body is securely held, the orientation of the objective lens is not affected. This is the case, for example, when the clamping force is distributed as uniformly as possible over the outer circumference of the objective lens. The force fit may also be effectuated with the aid of magnetic force. In this case, permanent magnets are integrated into the annular body and into the objective lens. The firm bond that is alternatively or additionally provided may be established, for example, by an adhesion of the annular body with the objective lens. For this purpose, prior to installation an adhesive may be applied to the annular body and/or the objective lens, which after installation or after the tolerance compensation effectuates the desired firm bond.

According to one preferred specific embodiment of the present invention, the annular body is made of an elastically deformable material, at least in areas, and rests against the objective lens on the outer circumferential side under radial pretensioning. Due to the radial pretensioning, the contacts of the annular body are pressed against the electrical interface that is formed at the objective lens, so that the electrical contacting is securely and permanently established. The annular body may be made, for example, of an elastically deformable plastic that is expanded when the annular body is slid onto the objective lens. Conductive materials or elements may be used to form the contacts situated on the inner circumferential side. For example, the contacts may be made of a conductive foam material. Alternatively, metal springs may be used to form the contacts.

According to a further preferred specific embodiment of the present invention, the annular body includes a slot. This means that the annular body is designed as an open ring. In this case the annular body may be designed as a clamping ring that is expanded when the annular body is slid onto the objective lens, so that the annular body rests against the objective lens under radial pretensioning. The clamping ring may be made, for example, of a metal, in particular spring steel, and encased on all sides by plastic in order to prevent an electrical short circuit. The contacts situated on the inner circumferential side may be designed as described in the paragraph above.

The design of the annular body as an open clamping ring also has the advantage that the installation of the camera module is simplified. For example, prior to installation the clamping ring may be inserted into a housing of the camera module and clampingly connected to the housing. For this purpose, the housing may include a clamping web that is inserted into the slot of the clamping ring, so that the clamping ring is expanded. The clamping ring is thus initially clampingly held at the clamping web of the housing. The objective lens may subsequently be inserted into the housing, the clamping ring coming to rest against the objective lens and being entrained with it. The objective lens thus pulls the clamping ring from the clamping web of the housing, so that the clamping ring clampingly rests around the objective lens. The objective lens advantageously has an entrainer geometry at which the clamping ring comes to rest. This may be formed by a cone or an annular collar, for example.

Furthermore, in accordance with an example embodiment of the present invention, it is provided that the annular body is connected to the electronics system, in particular to the circuit board, of the camera module via at least one electrical conductor, for example via a cable. The electrical conductor or the cable is preferably flexible, so that the annular body may be entrained by the objective lens and/or allows a tolerance compensation during the installation of the camera module.

Alternatively, it is provided that the annular body is fastened to a housing part, in particular to an objective lens holder, of the camera module via a flexible sheet material, for example via a fabric, a mesh, a film, or a diaphragm. The flexible sheet material, similarly to a Cardan suspension, allows movements of the annular body in all spatial directions, so that, although the annular body is held on the housing side, an alignment of the objective lens is still possible during the installation of the camera module.

The sheet material is preferably held in the housing part, in particular in the objective lens holder, of the camera module via a mounting ring. The mounting ring facilitates the housing-side connection of the flexible sheet material. This is because the mounting ring may be easily inserted or pressed into the housing part or into the objective lens holder. In addition, an electrical connection to the internal electronics system, in particular to the circuit board, of the camera module may be easily established via the mounting ring, since the position of the mounting ring is unchangeable. This means that a flexible electrical conductor is not absolutely necessary in order to establish an electrical connection with the electronics system or circuit board. Instead, a rigid plug-in connection may be selected.

In addition, it is provided that the sheet material includes or forms strip conductors. For example, the strip conductors may be printed on, glued on, or woven into the sheet material. For gluing or weaving in, in particular wires may be used as strip conductors. The contacts of the annular body may be connected via the strip conductors to an electrical interface that is formed at the mounting ring, so that the electrical connection to the electronics system, in particular the circuit board, of the camera module is thus established.

The objective lens preferably includes a cone and/or an annular collar in an end section facing the electronics system, in particular the circuit board. The cone facilitates the insertion or threading of the objective lens into the annular body, provided that the latter is already inserted into the housing part to be connected to the objective lens. At the same time, the cone may be used as an entrainer geometry when it expands to an outer diameter that is greater than the inner diameter of the annular body. The alternatively or additionally provided annular collar is likewise used to entrain the annular body during insertion of the objective lens.

Moreover, a method for manufacturing a camera module is provided. In accordance with an example embodiment of the present invention, in the method, an objective lens is inserted into a housing part, in particular into an objective lens holder, and aligned with respect to an image sensor of the camera module. According to an example embodiment of the present invention, for electrical contacting, the objective lens upon insertion into the housing part is introduced into an annular body, so that an electrical interface of the objective lens, formed on the outer circumferential side, comes into contact with contacts formed at the annular body on the inner circumferential side. Accordingly, the electrical contacting takes place in one work step with the insertion of the objective lens into the housing part or the objective lens holder. For this purpose, during the insertion it is necessary only to slide the annular body onto the objective lens. The annular body itself is preferably already connected to the electronics system of the camera module, so that it is necessary only to insert the objective lens into the housing part.

The method in accordance with the present invention may be carried out fully automatedly, so that it is suited in particular for mass production.

A force-fit and/or firmly bonded connection between the objective lens and the annular body are/is preferably established upon insertion of the objective lens into the annular body. For example, the annular body may clampingly rest around the objective lens upon insertion of the objective lens. For this purpose, the annular body is preferably designed as an open clamping ring. Alternatively, the annular body may have an elastically deformable design, at least in areas, so that it expands when it is slid onto the objective lens and rests against the objective lens under radial pretensioning. An adhesive bond may be used for the firmly bonded connection.

In addition, the annular body is preferably directly or indirectly held at the housing part before the objective lens is inserted. In the case of a clamping ring, the annular body may initially be clamped onto a clamping web of the housing part. When the objective lens is subsequently introduced, the clamping ring comes to rest against the objective lens and is entrained by it or pulled from the clamping web. In the case of a closed annular body, it may be held in the housing part via a flexible sheet material.

The flexible sheet material may be fixedly connected to the housing part via a mounting ring, for example, but movements of the annular body in all spatial directions are still possible due to the flexibility of the sheet material.

Thus, with the aid of the method in accordance with an example embodiment of the present invention, electrical contacting of the objective lens that is largely free of force and also tolerance-compensating may be achieved.

The method in accordance with an example embodiment of the present invention is suited in particular for manufacturing a camera module according to the present invention.

Preferred specific embodiments of the present invention are explained in greater detail below with reference to the figures.

DETAILED DESCRIPTION OF EXAMPLE EMBODIMENTS

Figure 1:
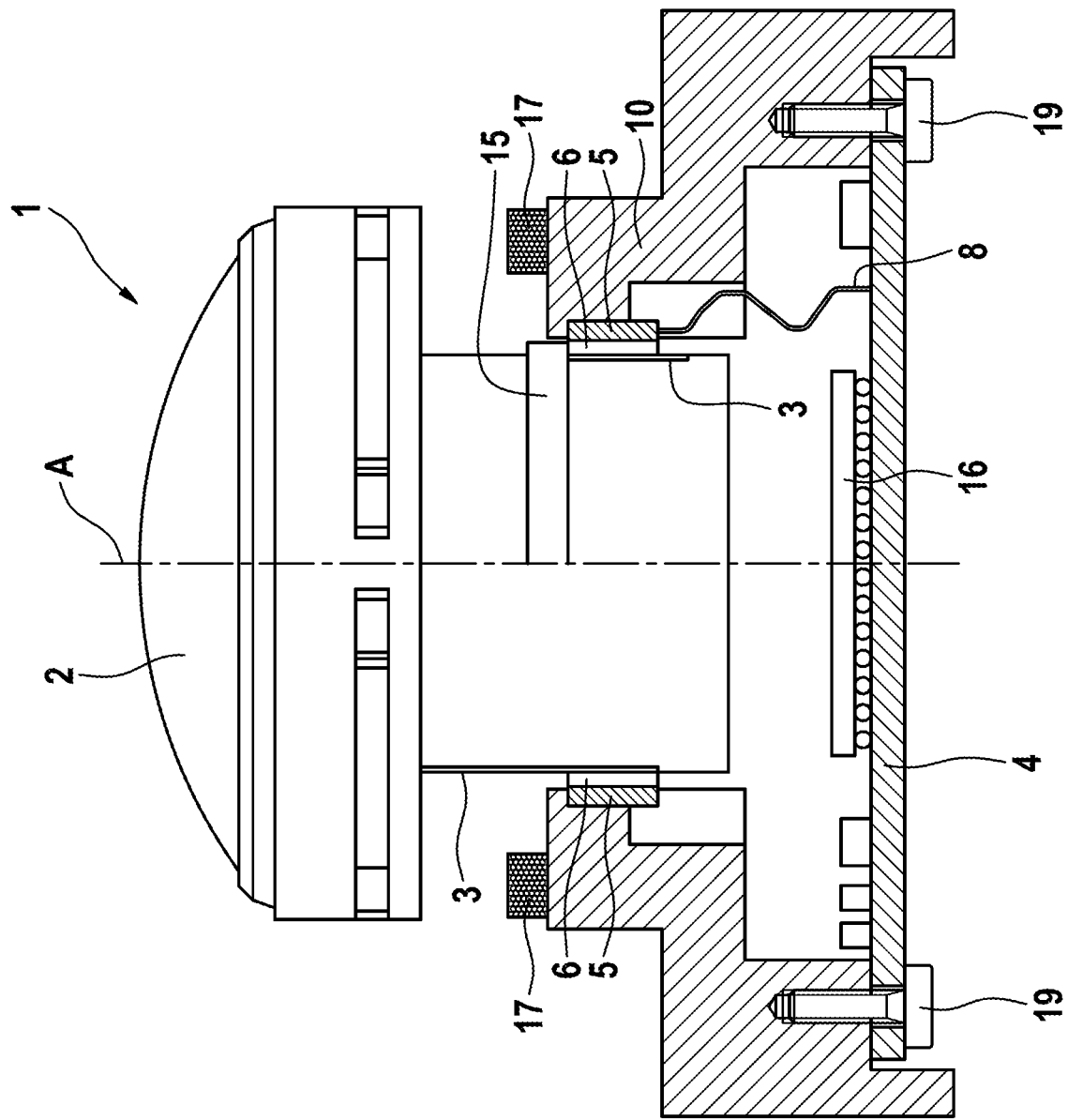
FIG. 1 shows a schematic longitudinal section of a first and a second camera module according to an example embodiment of the present invention during installation.

Two camera modules 1 according to the present invention are shown in FIG. 1, a first camera module on the left side and a second camera module on the right side. The camera modules differ with regard to the design of their objective lenses 2.

Both camera modules 1 share the common feature that objective lens 2 is inserted into a housing part 10 or an objective lens holder, and is surrounded by an annular body 5 in the area of an electrical interface 3 that is formed on the outer circumferential side.

Figure 4:
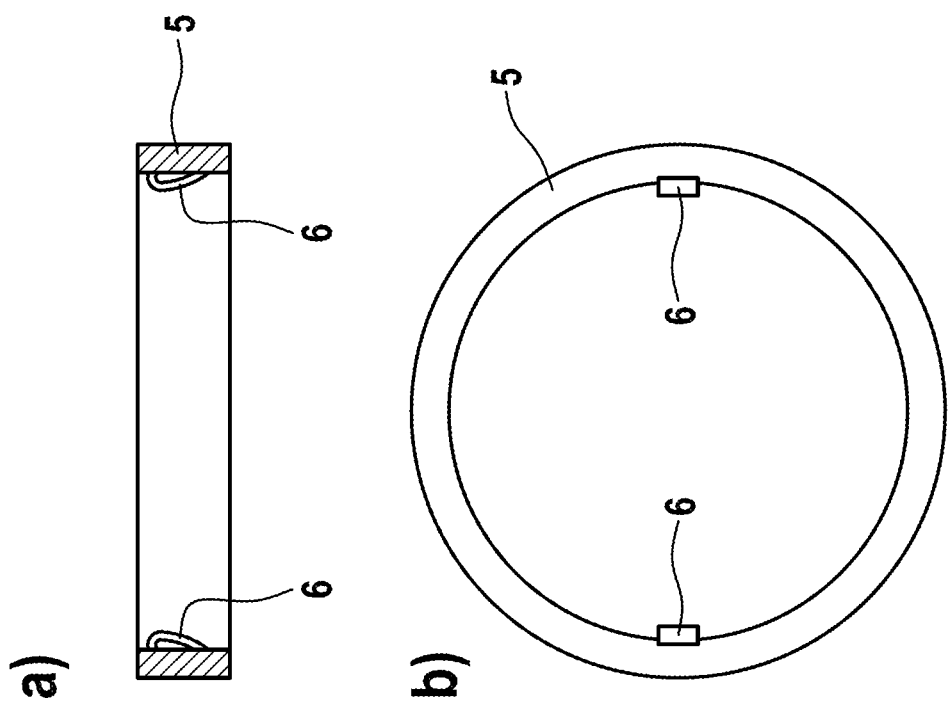
FIG. 4 shows a) a schematic longitudinal section and b) a schematic top view onto the annular body of the camera modules of FIG. 1.

As is shown in particular from FIGS. 4a) and 4b), annular body 5 includes diametrically opposed contacts 6 that are formed on the inner circumferential side. Annular body 5 is made of a plastic for electrical insulation. Contacts 6 on the inner circumferential sides are made of a conductive foam material.

In FIG. 1, which shows camera modules 1 during installation, i.e., during insertion of objective lenses 2 into housing part 10, annular body 5 is held by housing part 10. For this purpose, annular body 5 rests against housing part 10 under slight radial pretensioning. Upon insertion of particular objective lens 2 into housing part 10, contacts 6 of annular body 5 come to rest against electrical interfaces 3 of particular objective lens 2, and the force fit between annular body 5 and housing part 10 is eliminated in the further course of the movement of objective lens 2. Annular body 5 is now connected only to objective lens 2 and is entrained by objective lens 2. For objective lens 2 on the left side, this is achieved solely via the particular diameter ratios. Objective lens 2 on the right side has an entrainer geometry in the form of an annular collar 15 for entrainment of annular body 5. The entrainment of annular body 5 allows an alignment of objective lens 2 with respect to an image sensor 16 of camera module 1. The alignment is used to compensate for manufacturing tolerances. After the alignment, objective lens 2 is fixed in position with the aid of adhesives 17 situated between objective lens 2 and housing part 10 (cf. FIG. 2).

Annular body 5 or its contacts 6 is/are connected to a circuit board 4 of camera module 1 via a cable that is used as an electrical conductor 8. Since the cable is flexible, it does not hinder the alignment of objective lens 2 with respect to image sensor 16. In the present case, image sensor 16 is situated on circuit board 4, which is fastened to housing part 10 with the aid of screws 19.

One alternative specific embodiment of an annular body 5 for camera modules 1 of FIG. 1 is illustrated in FIGS. 5a) and 5b). Annular body 5 is made of a plastic, and on the inner circumferential side includes two oppositely situated metallic contact springs as contacts 6. As an alternative to the plastic material, annular body 5 may be made of a metal and may be extrusion-coated with plastic. The same applies for annular body 5 of FIGS. 4a) and 4b).

Figure 3:
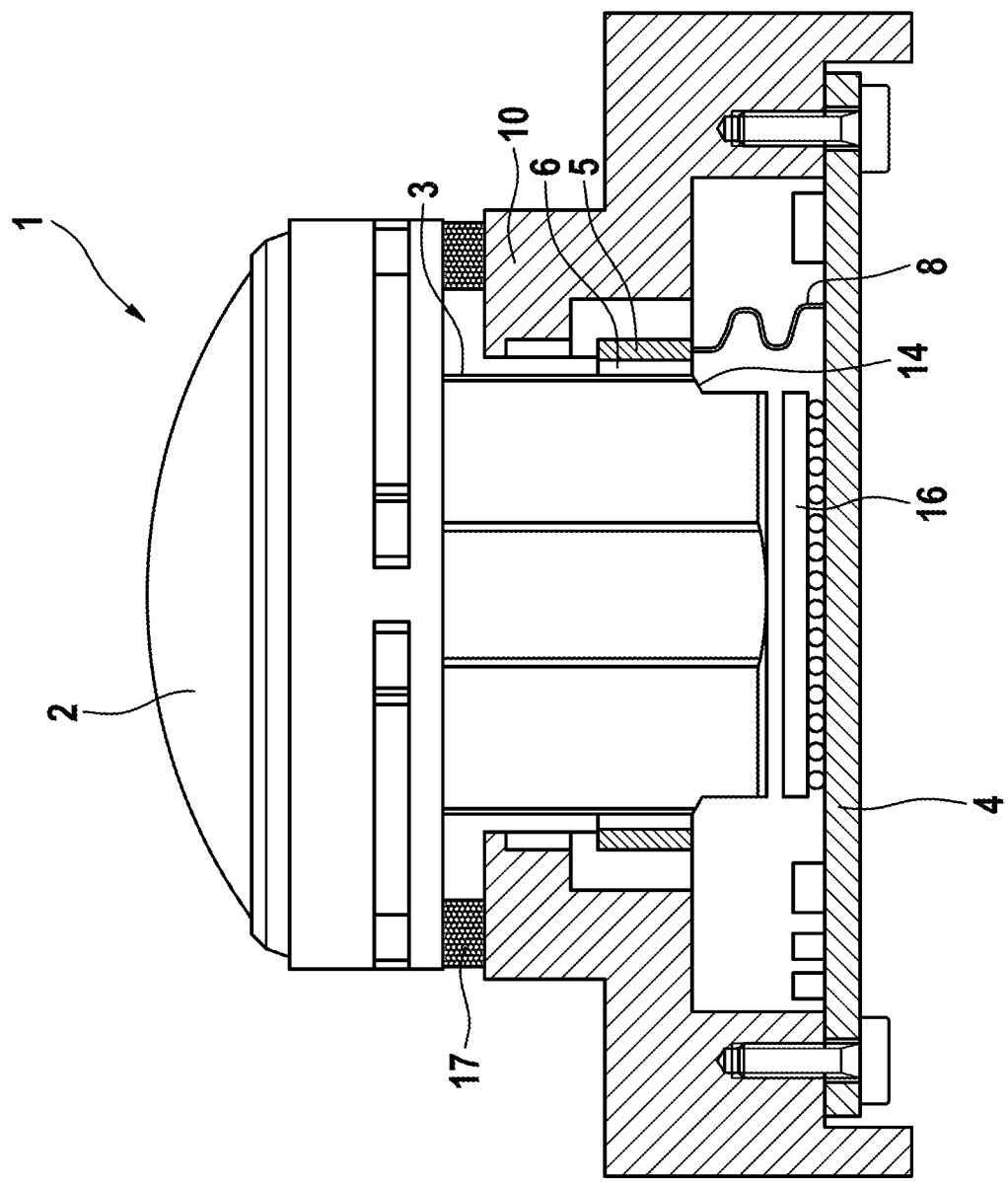
FIG. 3 shows a schematic longitudinal section of a third camera module according to an example embodiment of the present invention.
Figure 6:
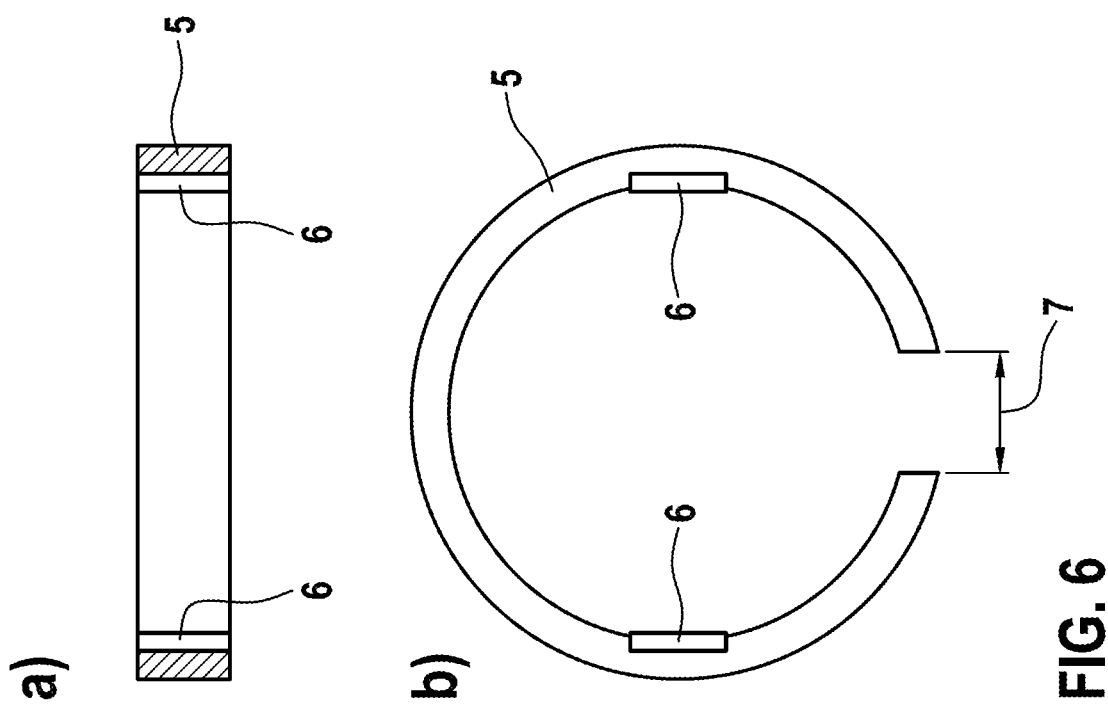
FIG. 6 shows a) a schematic longitudinal section and b) a schematic top view onto the annular body of the camera module of FIG. 3.

A third preferred specific embodiment of a camera module 1 according to the present invention is apparent from FIG. 3. Objective lens 2 is already completely installed, and is fixed in position at housing part 10 with the aid of adhesive 17. Annular body 5 is designed as an open clamping ring according to FIGS. 6a) and 6b) or according to FIGS. 7a) and 7b). Annular body 5 according to FIGS. 6a) and 6b) includes two oppositely situated contacts 6 made of a conductive foam material, as well as a slot 7. The base material is plastic or a metal that is extrusion-coated with plastic. Annular body 5 of FIGS. 7a) and 7b) includes two oppositely situated contact springs as contacts 6, and is likewise made of plastic or a metal that is extrusion-coated with plastic.

Figure 8:
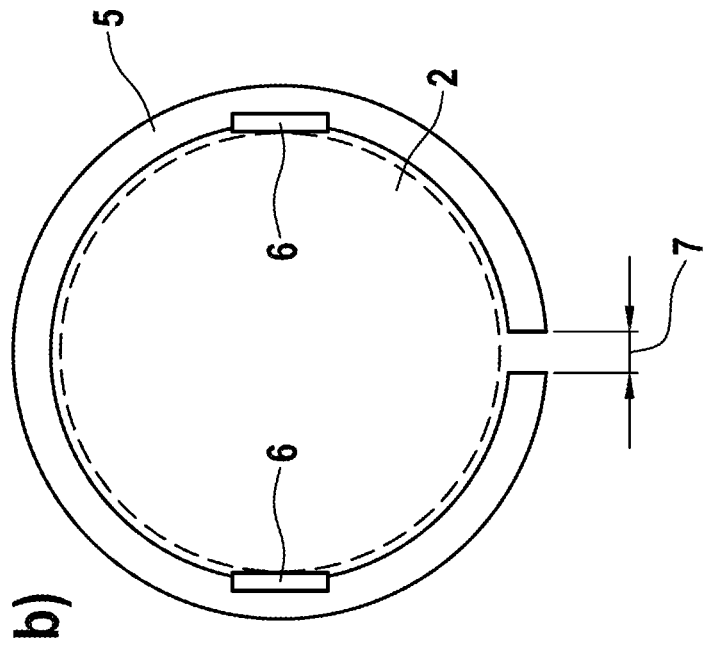
FIG. 8 shows the annular body of FIG. 7, a) before installation and b) after installation.
Figure 8:
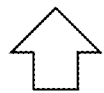
Figure 8:
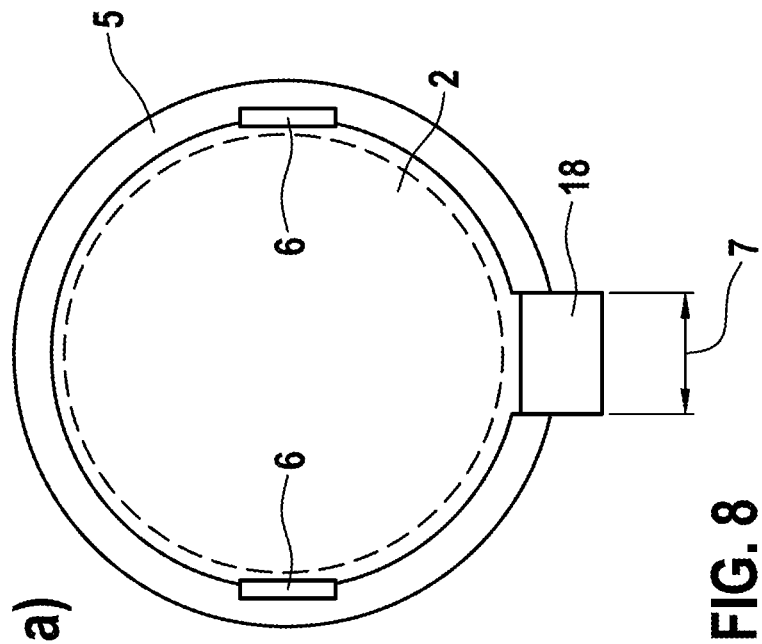

As illustrated by way of example in FIGS. 8a) and 8b), annular body 5 designed as a clamping ring allows a force-fit connection to housing part 10 before objective lens 2 is inserted into housing part 10. For this purpose, a clamping web 18 whose width is greater than the width of slot 7 is formed at housing part 10. Accordingly, when the clamping ring is placed on clamping web 18, the clamping ring is expanded, so that in the circumferential direction the clamping ring is pretensioned with respect to the clamping web and is thus held (cf. FIG. 8a)). When objective lens 2 is subsequently inserted, with a cone 14 provided at objective lens 2 facilitating the insertion (cf. FIG. 3), annular body 5/the clamping ring comes to rest against objective lens 2, and is entrained by objective lens 2 and pulled from clamping web 18, so that the pretensioned clamping ring relaxes and rests around objective lens 2 (cf. FIG. 8b)).

Figure 5:
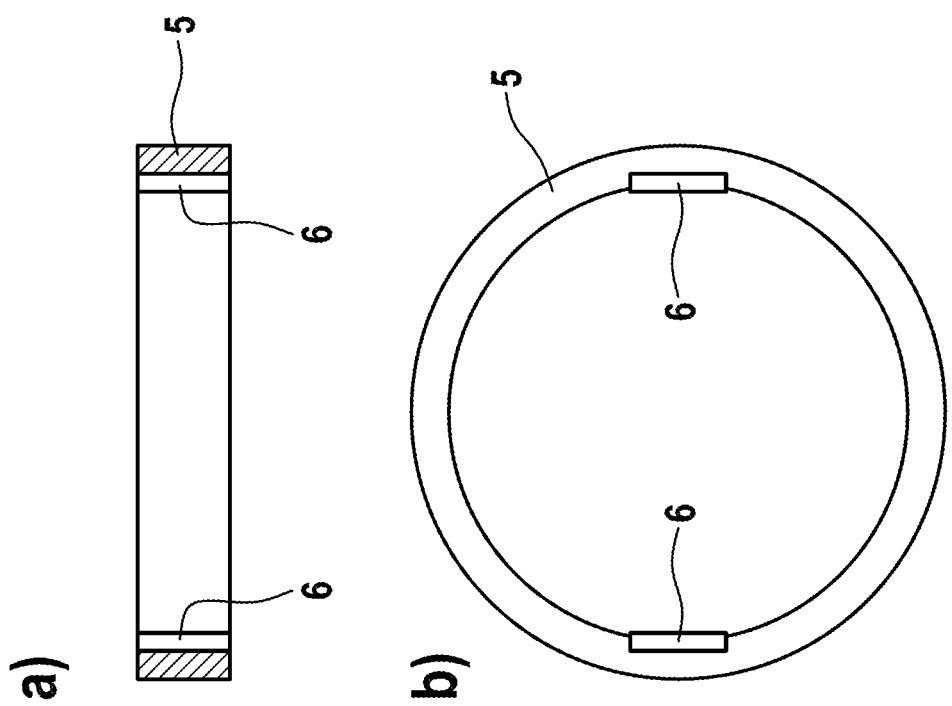
FIG. 5 shows a) a schematic longitudinal section and b) a schematic top view onto an alternative annular body for the camera modules of FIG. 1.
Figure 7:
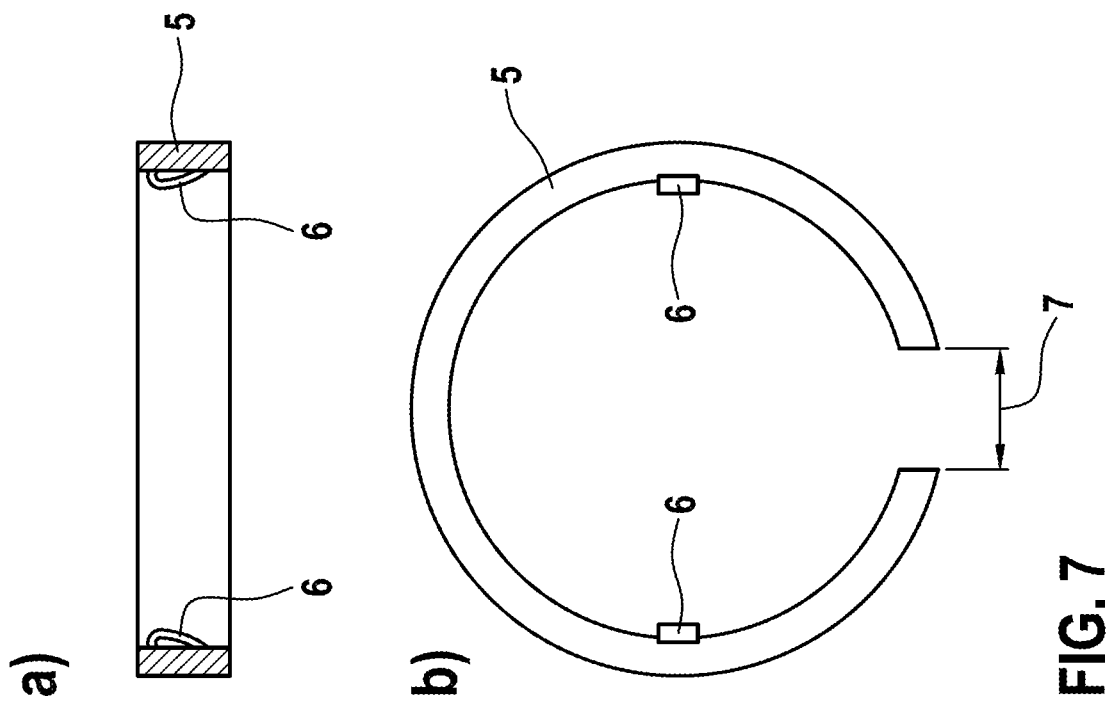
FIG. 7 shows a) a schematic longitudinal section and b) a schematic top view onto an alternative annular body for the camera module of FIG. 3.

As an alternative to the design according to FIGS. 8a) and 8b), instead of contacts 6 made of a conductive foam material the clamping ring may include metallic contact springs as contacts 6, analogously to FIGS. 5 and 7.

In addition, it is possible to equip objective lens 2 of the specific embodiment in FIG. 3 with an annular collar 15 as an entrainer geometry, analogously to the specific embodiment in FIG. 1 (right side).

Figure 2:
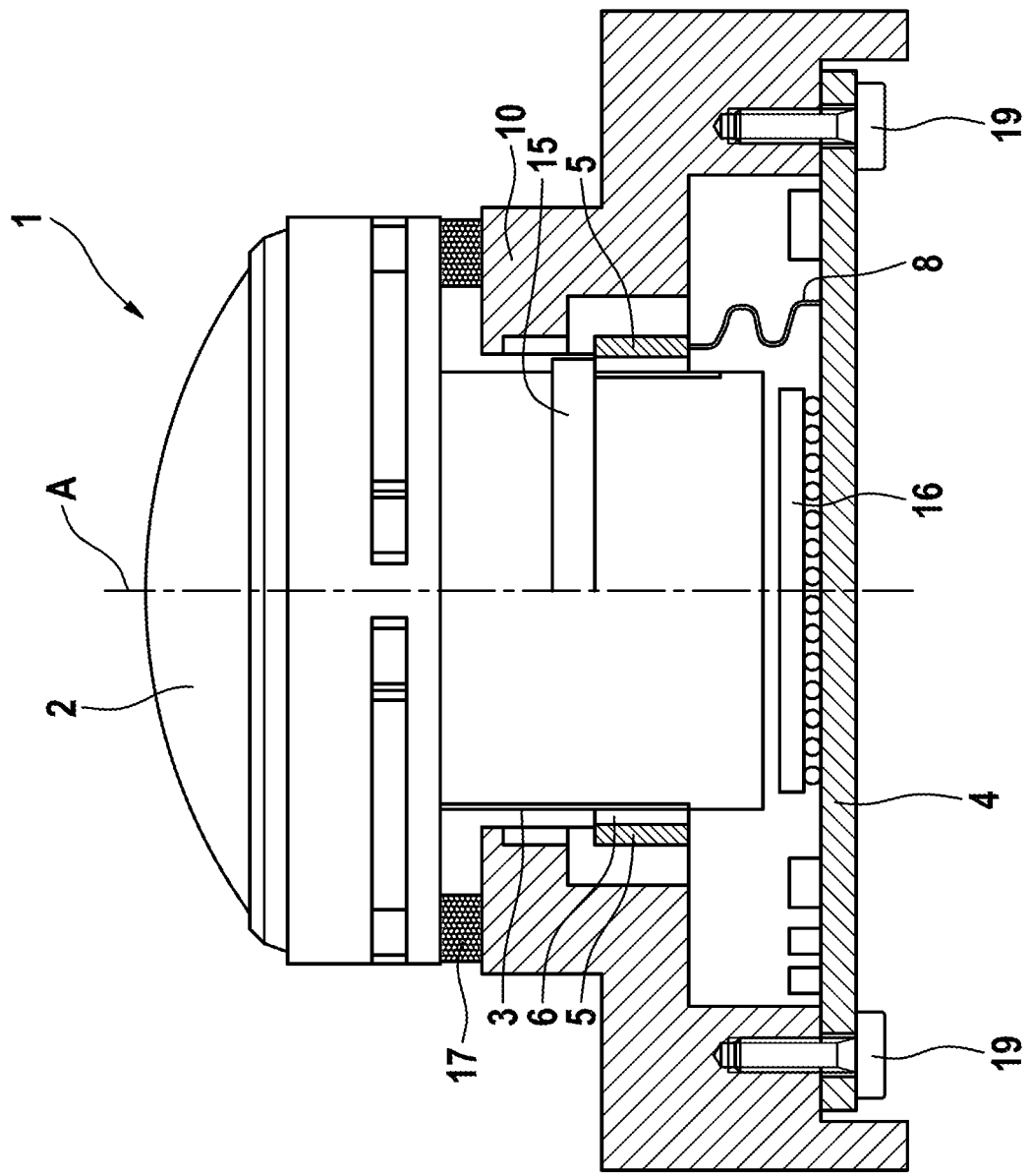
FIG. 2 shows a schematic longitudinal section of the first and the second camera module of FIG. 1 after installation.

In the specific embodiments in FIGS. 1, 2, and 3, electrical interface 3 provided at objective lens 2 on the outer circumferential side is formed in each case by strip conductors that are mounted on the outer circumferential side, and that extend in the longitudinal direction, i.e., in parallel to longitudinal axis A of objective lens 2. If an annular collar 15 is provided, the strip conductors end at annular collar 15, since annular body 5 also cannot be slid onto objective lens 2 beyond annular collar 15. The strip conductors extending in the longitudinal direction allow a variable installation depth of objective lens 2 with respect to housing part 10, since the electrical contacting of objective lens 2 is establishable via annular body 5, regardless of the installation depth.

Figure 9:
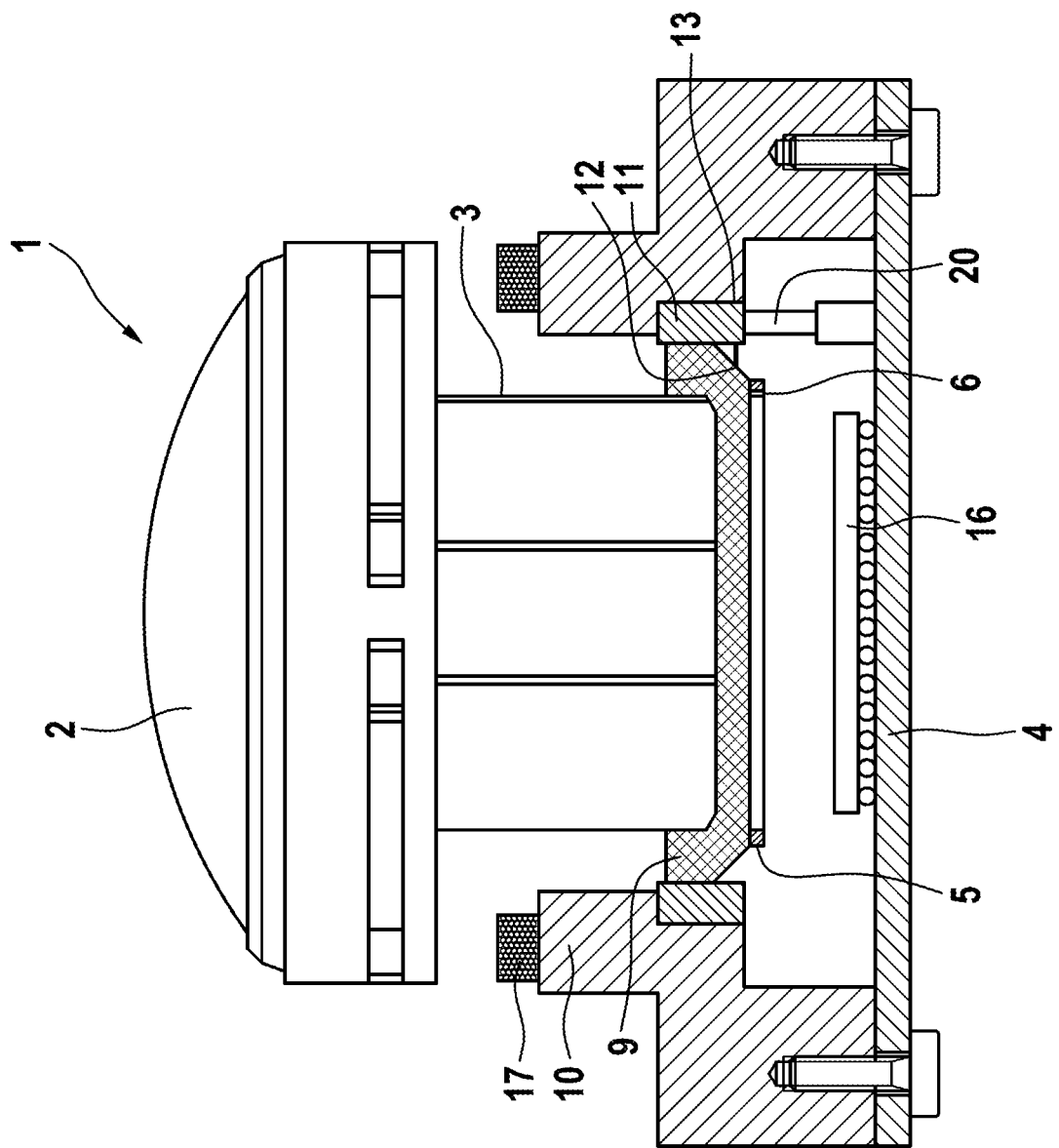
FIG. 9 shows a schematic longitudinal section of a fourth camera module according to an example embodiment of the present invention during installation.
Figure 10:
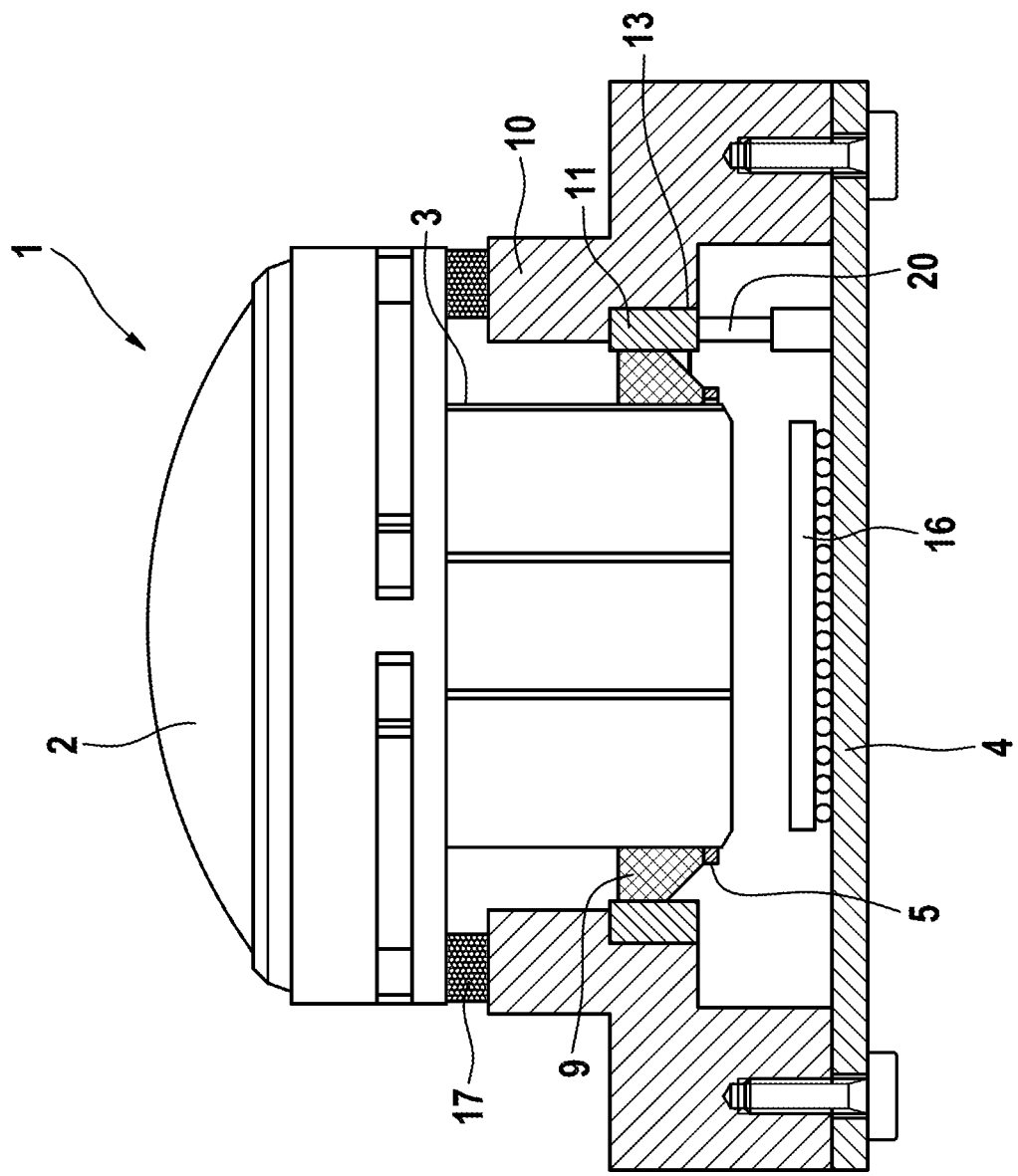
FIG. 10 shows a schematic longitudinal section of the camera module of FIG. 9 after installation.
Figure 11:
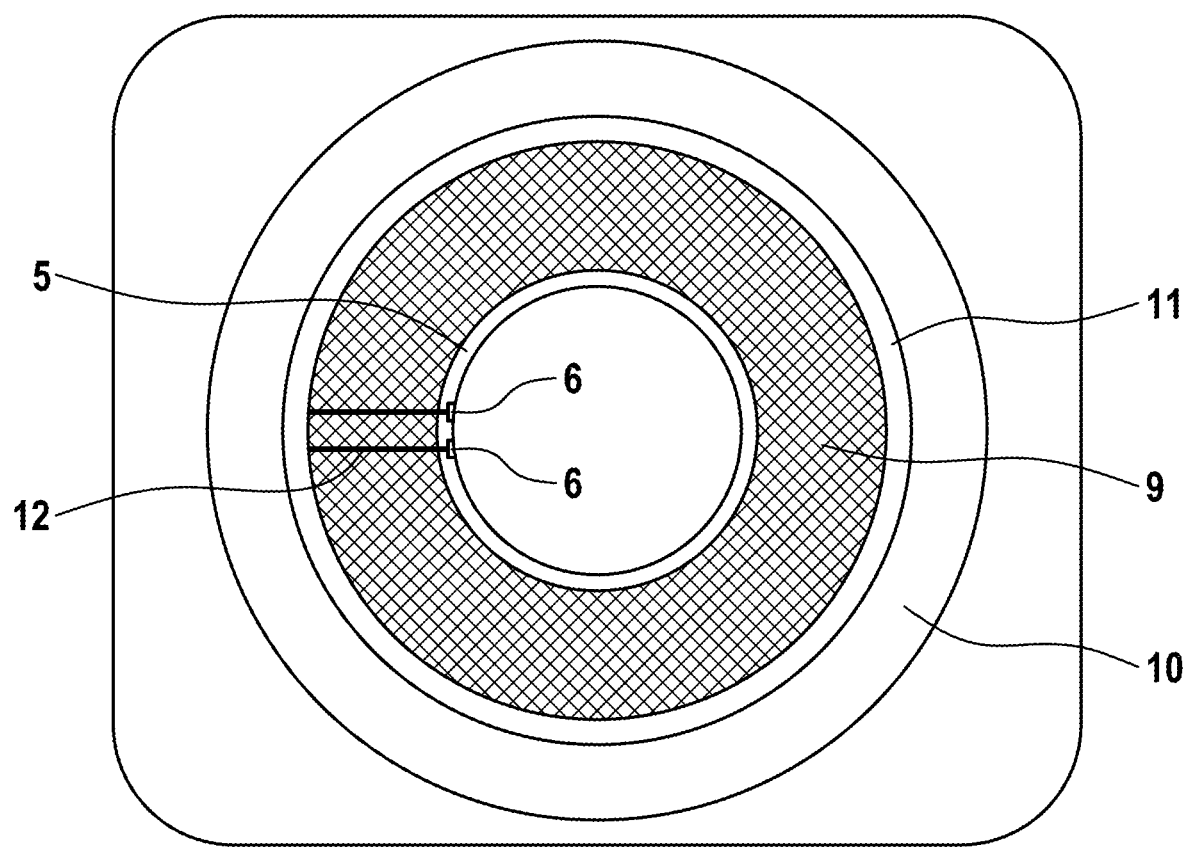
FIG. 11 shows a schematic top view onto the annular body of the camera module of FIG. 9, together with the sheet material and the housing.

A fourth preferred specific embodiment of a camera module 1 according to the present invention is illustrated in FIGS. 9 and 10. In this case, objective lens 2 is designed analogously to objective lens 2 of FIG. 3. In contrast to FIG. 3, annular body 5 is held in housing part 10 via a flexible sheet material 9 and a mounting ring 11, in particular not only prior to the insertion of objective lens 2 into housing part 10, but also afterward. Upon insertion of objective lens 2, annular body 5 slides onto objective lens 2, so that contacts 6 formed on the inner circumferential side come to rest against electrical interface 3 formed at objective lens 2, on the outer circumferential side. Here as well, the electrical interface is formed by strip conductors that extend in the longitudinal direction. As the result of sheet material 9 being flexible, objective lens 2 and annular body 5 may continue to move freely in order to align objective lens 2 with respect to image sensor 16. Due to the mounting ring 11 being installed in housing part 10 in a fixed position, in the area of an electrical interface 13 the mounting ring may be connected to circuit board 4 via a rigid plug 20. Electrical interface 13 at mounting ring 11 may be designed, for example, as a receptacle for plug 20. The connection of electrical interface 13 of mounting ring 11 to contacts 6 of annular body 5 is established via strip conductors 12 that are mounted on sheet material 9 or integrated into fabric 9, for example by weaving in (cf. FIG. 11).

What is claimed is:

1. A camera module, comprising:
   an objective lens with an electrical interface;
   a device configured to electrically contact the objective lens in an area of the electrical interface, wherein the device is also connected to an electronics system of the camera module;
   wherein the electrical interface is formed at the objective lens on an outer circumferential side of the objective lens, and the device includes an annular body situated on the objective lens on the outer circumferential side of the objective lens, with contacts formed on an inner circumferential side of the annular body,
   wherein the outer circumferential side of the objective lens is parallel to a longitudinal axis of the objective lens, and
   wherein the annular body is fastened to a housing part of the camera module via a sheet material.

2. The camera module as recited in claim 1, wherein the electronics system includes a circuit board.

3. The camera module as recited in claim 1, wherein the annular body is connected to the objective lens in a force-fit and/or bonded manner.

4. The camera module as recited in claim 1, wherein the annular body is made of an elastically deformable material, at least in areas, and rests against the objective lens on the outer circumferential side, under radial pretensioning.

5. The camera module as recited in claim 1, wherein the annular body includes a slot and is configured as an open ring.

6. The camera module as recited in claim 1, wherein the annular body is connected to the electronics system of the camera module via at least one electrical conductor.

7. The camera module as recited in claim 6, wherein the at least one electrical conductor includes a cable.

8. The camera module as recited in claim 1, wherein the sheet material allows movements of the annular body in all spatial directions, so that, although the annular body is held on the housing part, the objective lens is alignable during the installation of the camera module.

9. The camera module as recited in claim 8, wherein the housing part is an objective lens holder.

10. The camera module as recited in claim 8, wherein the sheet material is a fabric, or a mesh, or a film, or a diaphragm.

11. The camera module as recited in claim 8, wherein the sheet material is held in the housing part of the camera module via a mounting ring.

12. The camera module as recited in claim 11, wherein the sheet material includes or forms strip conductors that connect the contacts of the annular body to an electrical interface that is formed at the mounting ring.

13. The camera module as recited in claim 1, wherein the objective lens includes a cone and/or an annular collar, in an end section facing the electronics system.

14. A method for manufacturing a camera module, the method comprising:
   inserting an objective lens into a housing part and aligning the objective lens with respect to an image sensor of the camera module;
   wherein, for electrical contacting, the objective lens, upon insertion into the housing part, is introduced into an annular body, so that an electrical interface of the objective lens, formed on an outer circumferential side of the objective lens, comes into contact with contacts formed at the annular body on an inner circumferential side of the annular body,
   wherein the outer circumferential side of the objective lens is parallel to a longitudinal axis of the objective lens, and
   wherein the annular body is fastened to the housing part of the camera module via a sheet material.

15. The method as recited in claim 14, wherein the housing part is an objective lens holder.

16. The method as recited in claim 14, wherein a force-fit and/or bonded connection between the objective lens and the annular body is established upon insertion of the objective lens into the annular body.

17. The method as recited in claim 14, wherein the annular body is directly or indirectly held at the housing part before the objective lens is inserted.

18. The method as recited in claim 14, wherein the sheet material includes or forms strip conductors that connect the contacts of the annular body to the electrical interface that is formed at the mounting ring, and wherein the strip conductors extending in the longitudinal direction allow a variable installation depth of the objective lens with respect to the housing part, since the electrical contacting of the objective lens is provided via the annular body, regardless of an installation depth.

19. The camera module as recited in claim 1, wherein the sheet material includes or forms strip conductors that connect the contacts of the annular body to the electrical interface that is formed at the mounting ring, and wherein the strip conductors extending in the longitudinal direction allow a variable installation depth of the objective lens with respect to the housing part, since the electrical contacting of the objective lens is provided via the annular body, regardless of an installation depth.

* * * * *